(12) United States Patent
Wu et al.

(10) Patent No.: US 12,298,497 B2
(45) Date of Patent: May 13, 2025

(54) MOTORS FOR DRIVING MULTI-ELEMENT OPTICAL SCANNING DEVICES, AND ASSOCIATED SYSTEMS AND METHODS

(71) Applicant: SZ DJI TECHNOLOGY CO., LTD., Shenzhen (CN)

(72) Inventors: Jingyang Wu, Shenzhen (CN); Dong Lu, Shenzhen (CN); Yangyang Wu, Shenzhen (CN); Zezheng Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 589 days.

(21) Appl. No.: 17/651,864

(22) Filed: Feb. 21, 2022

(65) Prior Publication Data

US 2022/0179200 A1 Jun. 9, 2022

Related U.S. Application Data

(63) Continuation of application No. PCT/CN2019/102069, filed on Aug. 22, 2019.

(51) Int. Cl.
G02B 26/08 (2006.01)
G01S 7/481 (2006.01)
G02B 26/10 (2006.01)

(52) U.S. Cl.
CPC .......... *G02B 26/108* (2013.01); *G01S 7/4817* (2013.01); *G02B 26/0891* (2013.01)

(58) Field of Classification Search
CPC .......... G02B 26/108; G02B 26/0891; G02B 26/101; G01S 7/4817
See application file for complete search history.

(56) References Cited

U.S. PATENT DOCUMENTS

| 7,293,886 B2 | 11/2007 | Holmgren et al. |
| 2007/0041018 A1* | 2/2007 | Krupkin ............. G01J 1/0403 356/455 |
| 2012/0105923 A1 | 5/2012 | Mikkelsen et al. |

(Continued)

FOREIGN PATENT DOCUMENTS

| CN | 1703646 A | 11/2005 |
| CN | 100471009 C | 3/2009 |

(Continued)

OTHER PUBLICATIONS

Extended European Search Report for European Application No. 19817934.3, mailed by the European Patent Office on Nov. 3, 2020 (8 pages).

(Continued)

*Primary Examiner* — Euncha P Cherry
(74) *Attorney, Agent, or Firm* — ANOVA LAW GROUP, PLLC

(57) ABSTRACT

Motors for driving multi-element optical scanning devices and associated systems and methods include an exemplary optical system. The optical system includes at least one optical element positionable along an optical path to receive radiation, with the at least one optical element having an opening therethrough; a shaft extending through the opening; at least one bearing operably coupled to the shaft; and a motor operably coupled to the at least one optical element to rotate the at least one optical element.

17 Claims, 19 Drawing Sheets

(56) References Cited

U.S. PATENT DOCUMENTS

| | | | |
|---|---|---|---|
| 2015/0378152 A1 | 12/2015 | Kodani et al. | |
| 2018/0287459 A1 | 10/2018 | Huang et al. | |
| 2020/0142186 A1* | 5/2020 | Kamikura | G03G 15/0409 |

FOREIGN PATENT DOCUMENTS

| | | |
|---|---|---|
| CN | 105319705 A | 2/2016 |
| CN | 106842233 A | 6/2017 |
| CN | 109219496 A | 1/2019 |
| CN | 109254286 A | 1/2019 |
| CN | 109870707 A | 6/2019 |
| CN | 114341673 A | 4/2022 |
| EP | 1623265 | 2/2006 |
| EP | 1698930 A2 | 9/2006 |
| EP | 2963470 A1 | 1/2016 |
| JP | H04352125 A | 12/1992 |
| JP | H05-503578 A | 6/1993 |
| JP | 2006-243538 A | 9/2006 |
| JP | 2009-223133 A | 10/2009 |
| JP | 2011167704 A | 9/2011 |
| JP | 2015-041013 A | 3/2015 |
| JP | 2016-012035 A | 1/2016 |
| WO | WO 1991/011290 A1 | 8/1991 |
| WO | WO 2004/099850 A1 | 11/2004 |

OTHER PUBLICATIONS

International Search Report and Written Opinion of the International Searching Authority for International Application No. PCT/CN2019/102069, mailed by the China National Intellectual Property Administration on May 15, 2020 (11 pages).

* cited by examiner

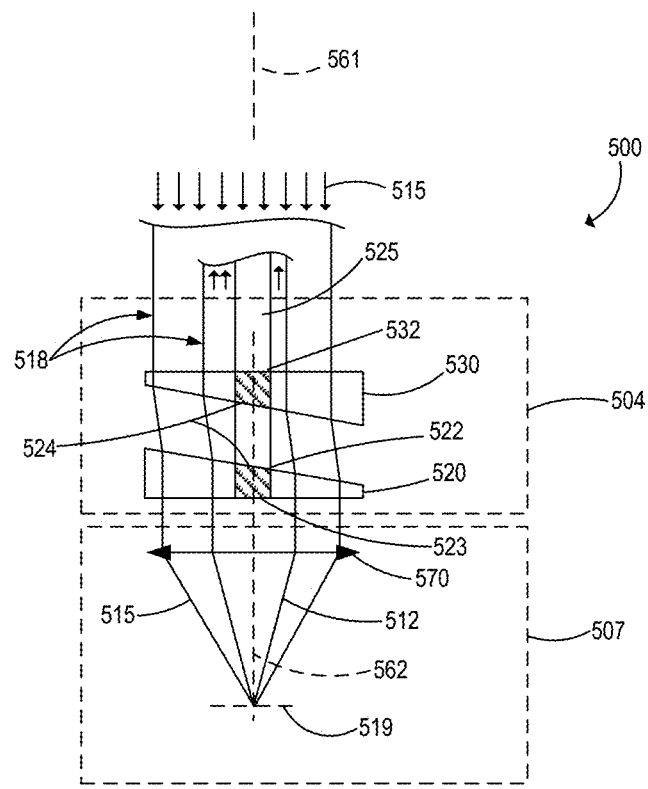
*FIG. 5A*
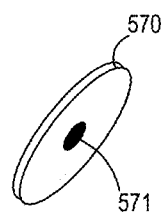 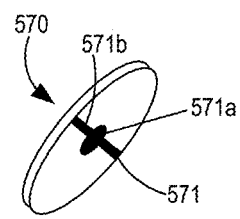
*FIG. 5B*        *FIG. 5C*

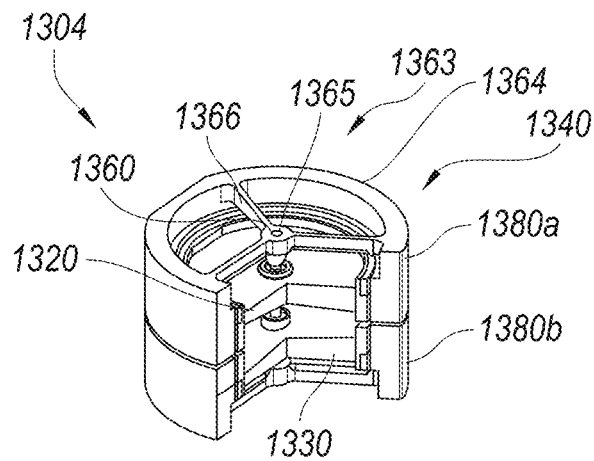 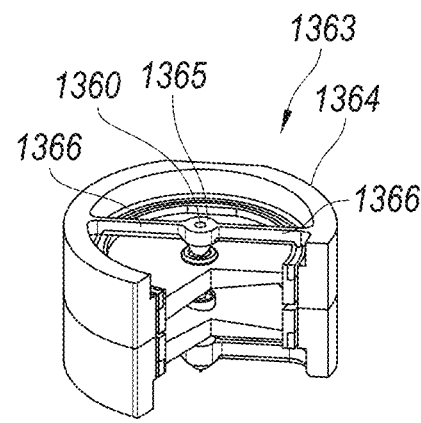
FIG. 13A  FIG. 13B
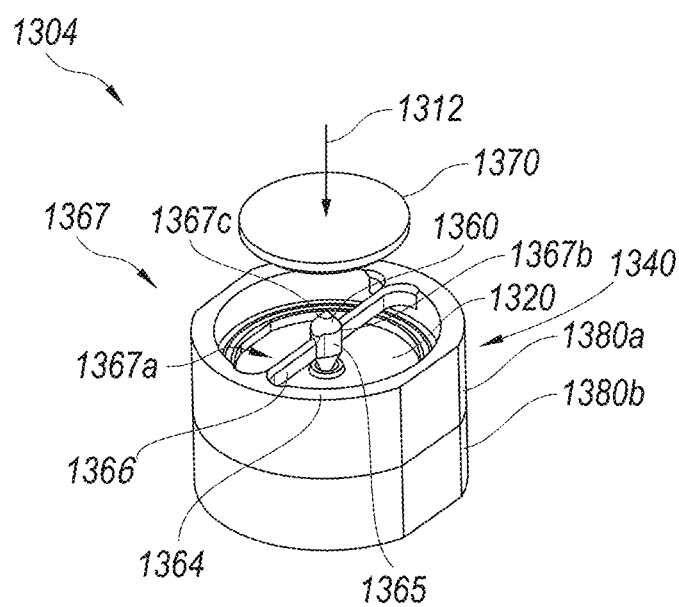 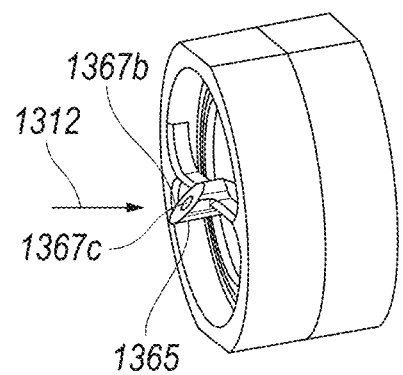
FIG. 14A  FIG. 14B

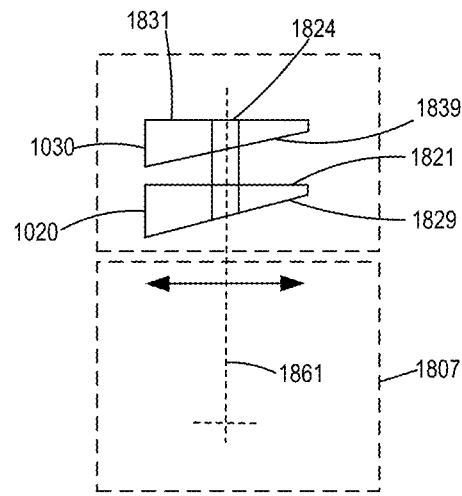
*FIG. 18C*
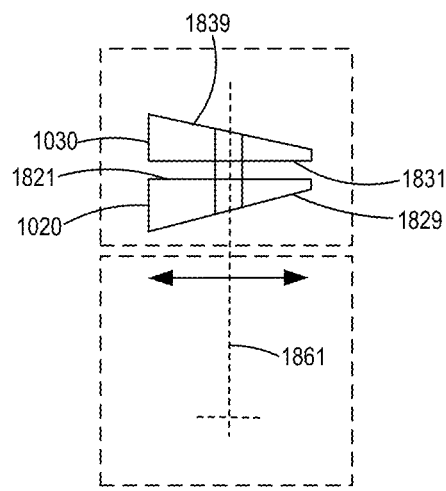 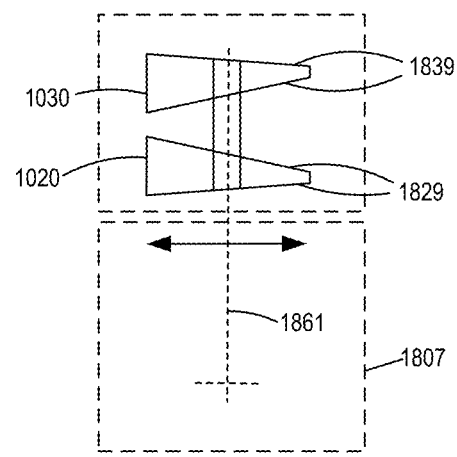
*FIG. 18D*     *FIG. 18E*

MOTORS FOR DRIVING MULTI-ELEMENT OPTICAL SCANNING DEVICES, AND ASSOCIATED SYSTEMS AND METHODS

CROSS-REFERENCE TO RELATED PATENT APPLICATIONS

This application is a continuation of International Application No. PCT/CN2019/102069, filed Aug. 22, 2019, the entire contents of which are incorporated herein by reference.

TECHNICAL FIELD

The present technology is directed generally to motors for driving multi-element optical scanning devices, and associated systems and methods.

BACKGROUND

Optical scanners have many applications including applications directed to autonomous driving. The environment of a mobile platform can typically be scanned or otherwise detected using one or more sensors such as LiDAR sensors which typically transmit a pulsed signal (e.g., laser signal) and detect reflections of the pulsed signal. Three-dimensional information about the environment can be determined in this way (e.g., at laser scanning points). While existing LiDAR sensors are typically suitable for their intended purpose, there is a continual user-driven demand for more compact, lightweight, long-lasting, and/or integratable LiDAR sensors for use on a wide variety of mobile platforms. Aspects of the technology described herein are directed to meeting these demands.

SUMMARY

Representative systems in accordance with the present technology include an optical system, comprising at least one optical element positionable along an optical path to receive radiation, the at least one optical element having an opening therethrough. The system can further include a shaft extending through the opening, a bearing operably coupled to the shaft, and a motor coupled to the at least one optical element to rotate the at least one optical element. The motor can include a stator and a rotor, and the system can further comprise a yoke coupled between the rotor and the at least one optical element.

In further representative embodiments, the shaft is fixed, with the bearing positioned in the opening. The stator can be positioned in the opening, and the rotor can be positioned either within or outside the opening.

The shaft can be supported via a shaft support, which can include, for example, a hub, a rim, and one or more spokes between the hub and rim. In representative embodiments, at least one of the shaft support or the shaft include a surface inclined at a non-orthogonal angle relative to the optical path to direct light off the optical path. The inclined surface can be provided in addition to, or in lieu of, a light-absorptive material.

In particular embodiments, the optical element has a weight distribution that is not axis symmetric relative to the shaft, and the system can further include a yoke carrying and positioned around the optical element, with the yoke having a weight distribution that is complementary to the weight distribution of the optical element.

In further particular embodiments, the bearing is axially loaded to at least reduce axial motion between elements of the bearing. For example, the system can include a pedestal having an inwardly facing step engaged with the bearing and an outwardly facing step engaged with the at least one optical element. The bearing can include two bearing elements, each bearing element including an inner race and an outer race, with the outer races of each bearing element positioned on opposite sides of the inwardly facing step and engaged with the inwardly facing step.

BRIEF DESCRIPTION OF THE DRAWINGS

FIG. 5A is a partially schematic illustration of a system having components with occluded areas, and corresponding light paths, in accordance with embodiments of the present technology.

FIG. 5B is a partially schematic illustration of a collimating element with a light extinction treatment configured in accordance with embodiments of the present technology.

FIG. 5C is a partially schematic illustration of a collimating element having another light extinction treatment configured in accordance with embodiments of the present technology.

FIGS. 13A and 13B are partially schematic illustrations of actuators having shaft supports configured in accordance with representative embodiments of the present technology.

FIGS. 14A and 14B are partially schematic illustrations of actuators having shaft supports and/or other representative elements inclined in accordance with representative embodiments of the present technology.

FIGS. 18A-18E illustrate representative configurations of optical elements having sloped, angled, or inclined surfaces arranged in accordance with embodiments of the present technology.

DETAILED DESCRIPTION

The present technology is directed generally to small bearings and motors for driving multi-element optical scanning devices, and associated systems and methods. In representative embodiments, the bearings are configured to be positioned within openings of the optical elements, as opposed to at the outer edges of the optical elements. This arrangement can reduce the velocities associated with the bearing components, thereby reducing component wear and extending the lifetime of the devices. The motors can be integrated with the bearings and the optical elements in manners that are more compact than traditional devices, allowing these devices to be used in contexts where low weight and low volume provide significant overall system advantages.

Representative ranging devices (e.g., LiDAR devices) are described under Heading 1 below ("Introduction"). Representative devices and systems that incorporate the small bearings and/or motors into multi-element devices are described in further detail under Heading 2 below ("Representative Systems and Methods").

1. Introduction

Representative devices in accordance with the present technology include LiDAR devices, laser ranging equipment and other electronic equipment. In representative implementations, a ranging device is used to sense the external environment and obtain corresponding information, for example, the distance to a target, the azimuth angle of an object or component, the strength of reflected light or other radiation, the speed of an object, among others. For example, the ranging device can detect the distance from the detector to a target object by measuring the light propagation time between the ranging device and the object, that is, the light flight time (time-of-flight, or "TOF"). The ranging device can use other techniques in addition to or in lieu of TOF to detect the distance from the ranging device to the object, such as a ranging method based on phase movement (phase shift) measurements, or a ranging method based on frequency movement (frequency shift) measurements.

Throughout the discussion of the present technology, the radiation emitted and received by the ranging device may be referred to as light, laser light, beams, etc. Unless otherwise noted, such terms are used as representative examples of electromagnetic radiation. Accordingly, the present technology includes all suitable electromagnetic radiation, whether in the visible spectrum or not.

Figure 1:
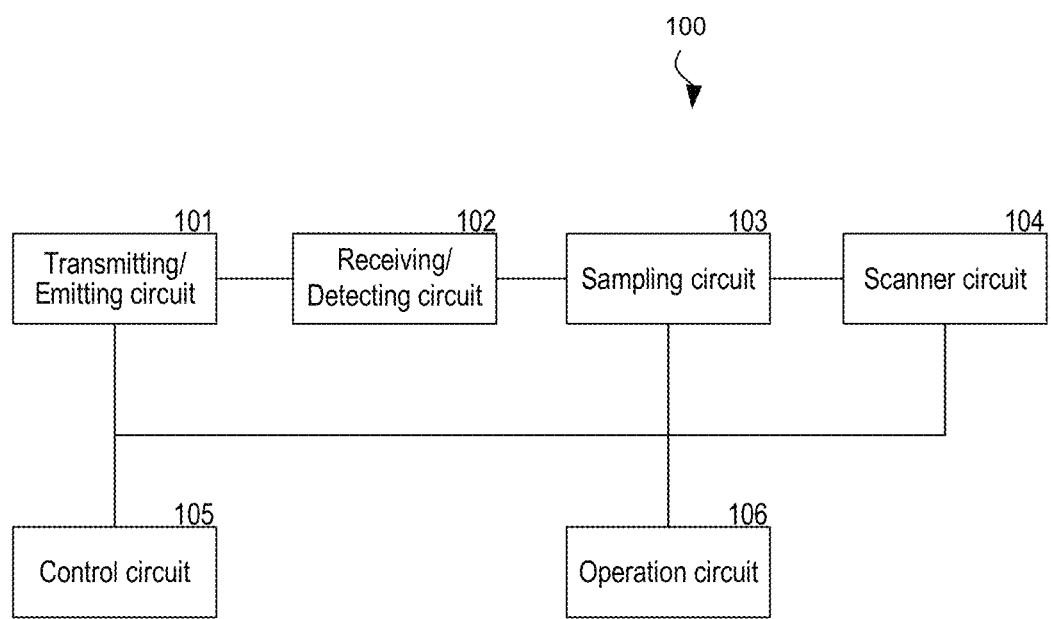
FIG. 1 is a schematic block diagram of a system for sensing an environment around a vehicle or other moving object, in accordance with embodiments of the present technology.

FIG. 1 illustrates a representative system 100 (e.g., for performing ranging tasks) that can include a transmitting (or emitting) circuit 101, a receiving (or detecting) circuit 102, a sampling circuit 103, and an operation circuit 104. The transmitting or emitting circuit 101 can emit light, or other electromagnetic, pulse sequences (such as laser pulse sequences), e.g., in the form of a beam. The receiving circuit 102 can receive the light pulse sequence reflected by the detected object, and convert the light pulses to an electrical signal (e.g., via the photoelectric effect). The electrical signal can be processed and then output to the sampling circuit 103. The sampling circuit 103 directs sampling results to an operation circuit 106 which can determine the distance between the ranging system 100 and the detected object, and/or other useful information.

Optionally, the ranging system 100 can also include a control circuit 105 that controls one or more of the illustrated circuits, for example, the working time of each circuit and/or the operational parameters of each circuit.

Although the illustrated ranging system shown in FIG. 1 includes a transmission circuit, a receiving circuit, a sampling circuit and an operation circuit for detecting reflections from the emitted beam, in other embodiments, the number of transmission circuits, receiving circuits, sampling circuits, and/or computing circuits can be greater, e.g., for emitting/detecting multiple beams in the same direction or in different directions. The multiple beams (e.g., at least two beams) can be emitted at the same time, or they can be emitted at different times. In one example, the circuitry chips for at least two emitting circuits are encapsulated in the same module. For example, multiple laser emitting chips can be encapsulated together and placed in the same encapsulation space, as described later with reference to FIG. 3B.

In some implementations, in addition to the circuit shown in FIG. 1, the ranging system 100 can also include a scanning module (described further below with reference to FIG. 2), which is used to change the propagation direction of at least one laser pulse sequence emitted by the transmitting circuit.

In some implementations, modules including the emitting circuit 101, receiving circuit 102, sampling circuit 103 and operation circuit 104, optionally further including the control circuit 105, are referred to as a ranging module. The ranging module can be independent of other modules, for example, the scanning module.

Figure 2:
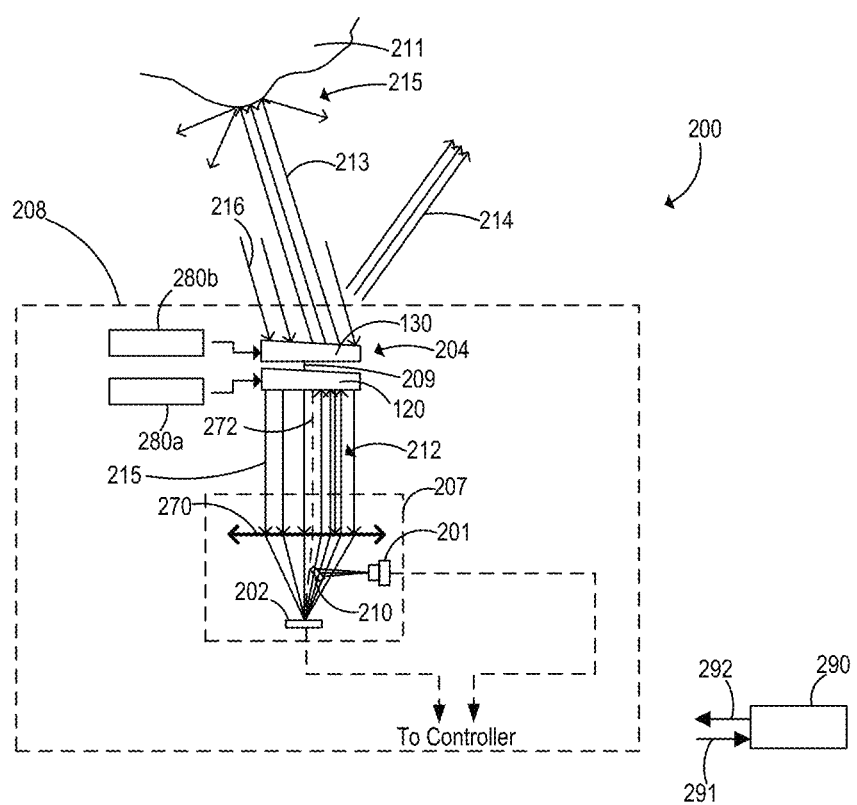
FIG. 2 is a partially schematic illustration of a system having optical elements positioned to transmit and receive light or other radiation, in accordance with embodiments of the present technology.

The beam emitted by the ranging device and the beam reflected by an object in the environment can share at least part of the same optical path in the ranging device, e.g., in a coaxial arrangement. Alternatively, the ranging device can include a heterogeneous optical path, that is, the beam emitted by the ranging device and the reflected beam are transmitted along different optical paths in the ranging device. FIG. 2, described further below, is a schematic diagram of an embodiment of the measuring device of the present technology that includes a coaxial light path.

Referring now to FIG. 2, a representative system 200 includes a ranging device 208. The ranging device 208 can include the transmitter (or emitter) 201 (which can include the transmitting circuit 101 described above), a collimation element 270, a receiver or detector 202 (which can include the receiving circuit 102, sampling circuit 103 and operation circuit 106 described above), and an optical path change element 210. The ranging device 208 is used to transmit a beam 212 and receive the reflected beam, converting the returned beam into an electrical signal. Accordingly, the transmitter 201 and receiver 202 may be referred to collectively as a transceiver 207. In some embodiments, the transmitter 201 can emit a laser pulse sequence, e.g., in the form of a laser beam. The laser beam can be a narrow bandwidth beam with wavelengths within or outside the visible light range. The collimation element 270 is arranged along an emitted light path or optical axis 272 of the transmitter 201 and is used to direct the beam 212 emitted from the transmitter 201, e.g., to straighten the beam to include parallel components before it reaches the associated scanner 204. The collimation element 270 can also be used to converge at least part of the reflected radiation 215 before it reaches the receiver 202. The collimation element 270 can include a collimation lens or other component configured to collimate the beam(s).

In an embodiment shown in FIG. 2, the paths along which the emitted light and the received light pass, merge in the ranging device 208 between the scanner 204 and the collimation element 270, so that the emitted light and the received light can share the same collimation element 270, making the light paths more compact. In other implementations, the system can include two collimation elements: one for emitted light and one for received light.

In the embodiment shown in FIG. 2, the beam aperture of the transmitter 201 is relatively small, and the beam aperture of the returned light received by the ranging device 208 is larger, so the optical path change element 210 can use a small area reflector to merge the paths of the emitted light and the received light. In other implementations, the optical path change element 210 can use a reflector with a through hole, wherein the through hole is used to pass the emitted light, and the reflector is used to reflect the returned light to the receiver 202.

The scanner 204 is placed along the path of the emitted light (e.g., beam) 212, and changes the direction of the beam collimated by the collimation element 270. The beam is then directed into the external environment, and the returned or reflected beam is directed by the scanner 204 back to the collimation element 270.

In some embodiments, the scanner 204 can include at least one optical element to change the propagation path of the beam, by reflection, refraction, diffraction, and/or other techniques. For example, the scanner 204 can include one or more lenses, mirrors, prisms, vibrators, gratings, liquid crystals, optical phased arrays, and/or any suitable combination of the foregoing optical elements. In one example, at least part of the optical element moves. In some embodiments, multiple optical elements of the scanner 204 can rotate or vibrate relative to a common axis (e.g., a rotation axis) 209, and each rotating and/or vibrating optical element can continuously alter the propagation direction of the emitted beam. In some embodiments, multiple optical elements of the scanner 204 can rotate and/or vibrate at different speeds, or at the same speed. In some embodiments, multiple optical elements of the scanner 204 can rotate/vibrate about different axes. In some embodiments, the multiple optical elements can rotate and/or vibrate in the same direction or in different directions.

In some embodiments, the scanner 204 includes a first optical element 120, coupled to a first actuator 280a to rotate the first optical element 120 around the rotation axis 209, thus changing the direction of the emitted beam 212. The angle between the direction of the beam 212 after passing through the first optical element 120 varies with the rotation of the first optical element 120. In one embodiment, the first optical element includes non-parallel opposing surfaces, e.g., a wedge-shaped prism with a thickness variation along at least one axis.

The scanner 204 can also include a second optical element 130, coupled to a second actuator 280b to rotate about the rotation axis 209, e.g., at a speed different than the rotation speed of the first optical element 120. The second optical element 130 changes the direction of the beam exiting the first optical element 120. Depending upon the configuration, the first optical element 120 and the second optical element 130 can be driven by the same or different actuators, but in either case, can direct the emitted beam 212 into different directions, thus scanning a larger space. The second optical element 130 can include any of the foregoing elements described above with reference to the first optical element 120, and can be the same as or different than the first element 120. In some embodiments, the scanner 204 further includes a third optical element (not shown in FIG. 2) and associated actuator.

Regardless of the number of optical elements included in the scanner 204, the scanner 204 can receive the incoming beam 212 (e.g., from the collimation element 270) and, as a result of rotating, vibrating, and/or undergoing other movement, redirect the incoming light in multiple directions, shown in FIG. 2 as a first direction 213 and a second direction 214. The emitted light strikes an object 211 in the environment, creating reflected light 215, some of which is directed in a third direction 216. Accordingly, at least a portion of the reflected light returns to the scanner 204, passes through the one or more optical elements, through the collimation element 270, and to the receiver 202. The receiver 202 generates an electrical signal which provides an input 291 to a controller 290. The controller 290 processes the input, along with other inputs, and directs an output 292. The output 292 can be used to control any of a variety of functions, including, but not limited to, the direction, speed, and/or orientation or pose of an autonomous or other vehicle.

Figure 3A:
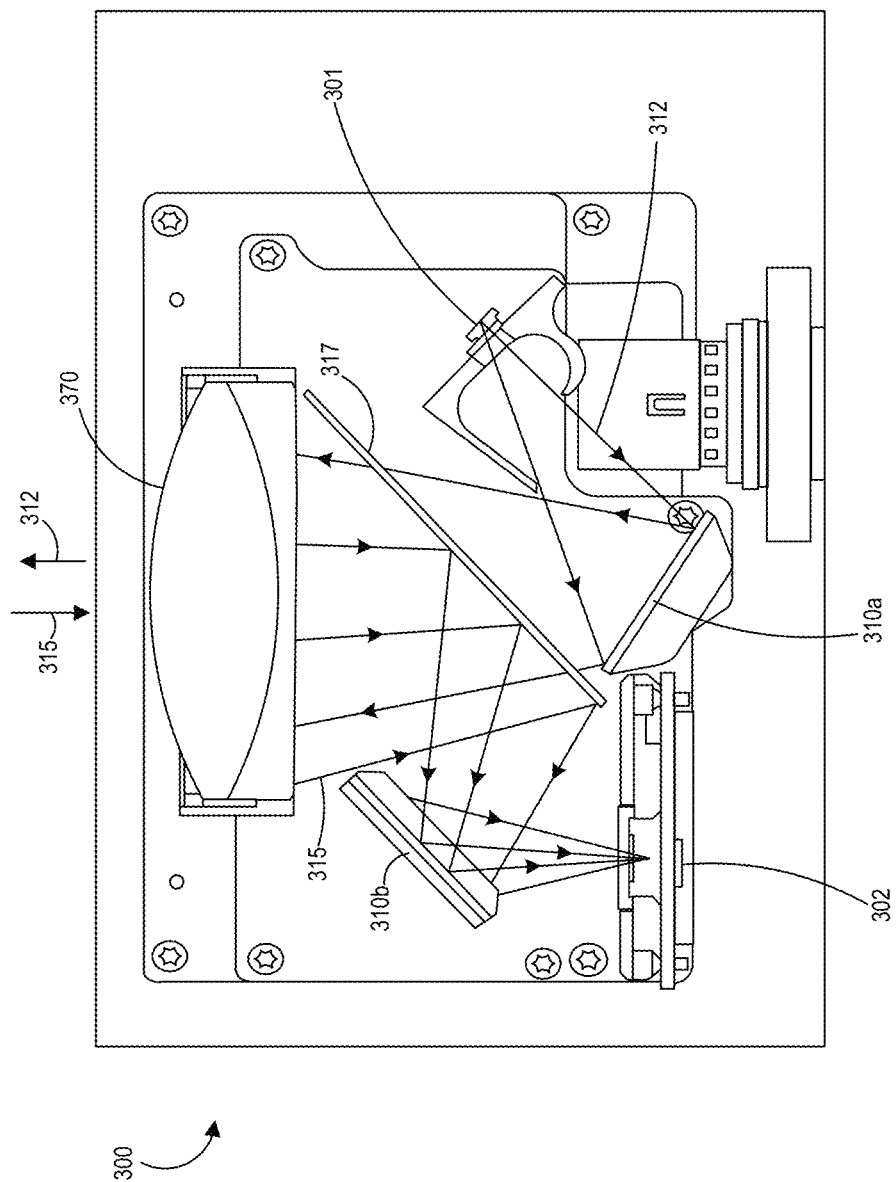
FIG. 3A is a partially schematic illustration of a representative light path configured in accordance with embodiments of the present technology.

FIG. 3A is a partially schematic illustration of a representative system 300 illustrating selected elements in further detail. The system 300 includes a transmitter or emitter 301 that directs emitted light 312 to a first mirror 310a. The first mirror 310a redirects the light to a collimation element 370, which in turn directs emitted light 312 to a scanner (not shown in FIG. 3A). Reflected light 315 is returned to the collimation element 370 where it passes through a splitter 317. A portion of the reflected light 315 impinges on a second mirror 310b, which redirects the reflected light to a receiver or detector 302. The receiver 302 generates the electrical signal which is directed to the controller 290 (FIG. 2).

Figure 3B:
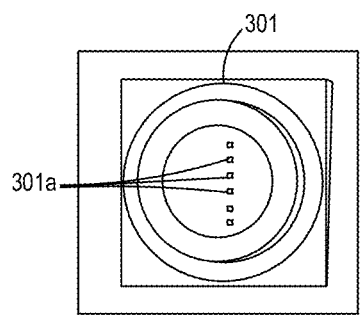
FIG. 3B is a partially schematic illustration of an emitter having one or more emitter elements configured in accordance with embodiments of the present technology.
Figure 3C:
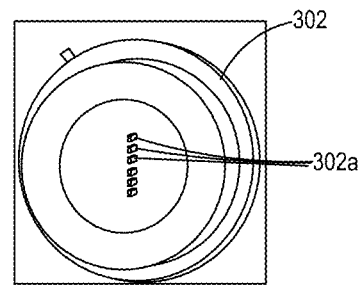
FIG. 3C is a partially schematic illustration of a receiver having one or more receiver elements configured in accordance with embodiments of the present technology.

FIG. 3B illustrates a representative emitter 301 that includes multiple emitter elements 301a, which can be encapsulated together. FIG. 3C illustrates a representative receiver 302, which includes multiple receiver elements 302a. The emitter elements 301a and receiver elements 302a can include any of a variety of suitable solid state devices, and/or other devices configured to emit and receive radiation inside or outside the visible spectrum. For example, the emitter elements 301a can include laser diodes, and the receiver elements 302a can include photodiodes.

The resulting information obtained from the receiver 302 can be used to generate distance and/or azimuth data corresponding to the detected object 211 (FIG. 1). This information can in turn be used for remote sensing, obstacle avoidance, mapping, modeling, navigation and/or other functions. The ranging devices in accordance with the present technology can be applied to a mobile platform, e.g., an autonomous or partially autonomous vehicle.

2. Representative Systems and Methods

One drawback associated with some conventional sensor systems is that they are large and bulky, which makes them difficult to integrate into smaller and/or weight-sensitive platforms. One cause for the additional bulk is the bearings that are used to provide smooth, low-friction rotation for the optical devices. For example, such bearings are typically placed around the outside of the optical devices. The optical devices are also typically driven from a radially outward position, so as to avoid interfering with the optical light paths within the scanner. Aspects of the present technology are directed to, instead, providing apertures or openings within the optical elements and placing the bearings and/or other elements of the drive mechanism within the openings. While this approach results in occluded regions along the optical path, the technology further includes techniques to address the occlusion, resulting in devices that are compact, lightweight, and yet still provide suitable ranging and detection functions.

Figure 4:
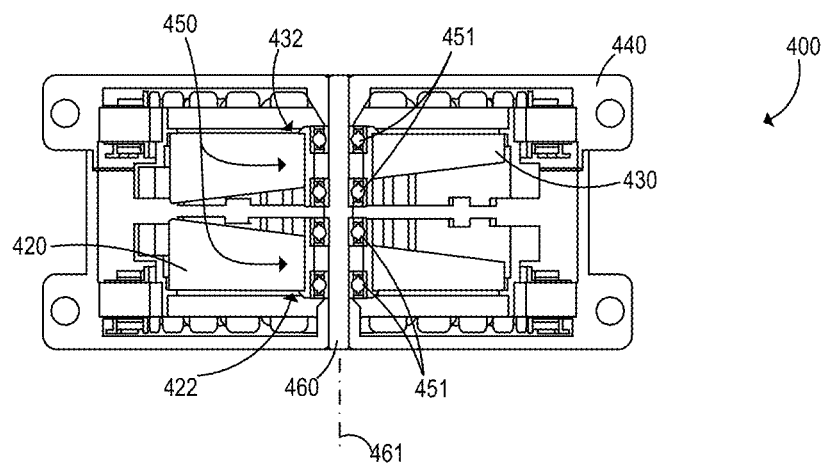
FIG. 4 is a partially schematic illustration of a system having multiple optical elements with bearings configured in accordance with embodiments of the present technology.

FIG. 4 illustrates a representative system 400 having a housing 440 in which a first optical element 420 (e.g., a first prism) and a second optical element 430 (e.g., a second prism) are positioned. Each optical element includes a corresponding opening, illustrated as a first opening 422 and a second opening 432. A shaft 460 extends along a shaft axis 461 and passes through the first and second openings 422, 432. One or more bearings 450, for example, each including multiple bearing elements 451, are positioned within the corresponding openings to stabilize the rotary motion of the first and second optical elements 420, 430 relative to the shaft 460. Accordingly, the shaft 461, in combination with the bearing(s) 450, can act as a mandrel to keep the optical elements 420, 430 centered as they smoothly rotate. By placing the bearings 450 close to the radial centers of the optical elements, the bearings 450 can be made smaller than bearings in typical conventional installations. In addition, the linear velocities near the radial centers of the optical elements are lower than at the tips of the optical elements, which reduces the wear and tear on the bearings and therefore can extend the operational life of the system 400. The bearings 450 can have a ball bearing configuration, for example, with an inner race, an outer race, and multiple balls between the races, optionally further including one or more retainers, and/or other suitable types of bearings. Such bearings can typically include oil or grease which, if the bearing heats up significantly, breaks down or otherwise suffers a reduction in efficacy. Accordingly, reducing the velocity of the bearing components can increase bearing efficiency and life by reducing the likelihood for adversely affecting the lubricant. Furthermore, at low temperatures, the lubricant becomes more viscous, and, with the greater moment arm resulting from the bearings being positioned at the outer periphery of the optical elements, can create so much friction that the optical elements are unable to rotate, and/or the actuators that drive the optical elements draw so much current that the associated circuitry fails. Again, positioning the bearings closer to the radial centers of the optical elements can reduce or eliminate this undesirable effect. Still further, by reducing frictional loads on the bearings, the amount of power required by the motors or other actuators driving the optical elements can be reduced, not only at start up, but also during normal operating conditions.

FIG. 5A illustrates further elements of a representative system 500. The system includes a transceiver 507 that transmits emitted light and receives reflected light to detect information corresponding to the external environment. The emitted light 512 proceeds from a focal plane 519, oriented along an orthogonal axis 562, to a collimating element 570 that collimates the light directed to the scanner 504. At the scanner 504, a first optical element 520 and a second optical element 530 receive the incoming emitted light 512, and rotate about a shaft axis 561. Each optical element includes a corresponding opening 522, 532 which houses a bearing, and which presents one or more occlusion surfaces 523 and produces a corresponding occlusion area 524. The occlusion area 524 results in an emitted light gap 525. The emitted light 512 proceeds along an optical path 518 to an object (not shown in FIG. 5A) which reflects the light, producing reflected light 515 that passes along the optical path 518 in the reverse direction. This arrangement is compact, and the light reduction resulting from the occlusion area 524 can be at or below acceptable levels.

The emitted light 512 passing from the collimating element to the scanner 504 can impinge upon, and reflect from, the occlusion areas 524 of the first and/or second optical elements 520, 530. Accordingly, typical designs will include occlusion areas 524 that are as small as possible, while providing enough area to accommodate the associated bearings and/or other elements. To reduce or eliminate such reflections which could otherwise create optical noise or other interference within the scanner 504, the collimating element 570 can (optionally) include light extinction treatments, described further below with reference to FIGS. 5B and 5C.

Referring first to FIG. 5B, the collimating element 570 can include a light extinction treatment 571 facing toward the focal plane 519 shown in FIG. 5A. Suitable light extinction treatments 571 can include materials that are highly absorptive of the emitted light (and/or have low reflectivity), thus reducing internal reflections within the scanner 504. Suitable materials include matt black oxidation, and/or coatings with light extinction paint. Such paint or other coatings can be applied to specific parts of the optical (or other) elements to prevent the emitted light striking such parts and producing undesirable reflections. As described later with reference to FIGS. 14A-15B, the device can include inclined or sloped surfaces to redirect internal reflections for absorption or attenuation. The light extinction treatment can have different patterns and/or arrangements, depending upon the shape of the occlusion areas 524 shown in FIG. 5A. For example, the light extraction treatment 571 shown in FIG. 5B has a generally circular shape located at the center of the collimating element 570, corresponding to a similarly-shaped occlusion area. In FIG. 5C, the light extinction treatment 571 includes a first generally circular region 571a, and a second region 571b that extends radially outwardly from the first region 571a. The second region 571b can account for other structures within the scanner (e.g., spokes or other support structures, described later with reference to FIGS. 13A, 13B) that may otherwise also reflect light within the scanner, creating optical noise.

In addition to, or in lieu of, the light extraction treatments described above, representative systems can include configurations that direct the emitted light in a way that avoids impinging on the occlusion areas, thus reducing or eliminating the need for light extinction treatments. FIGS. 6-8C illustrate representative systems having such configurations.

Figure 6:
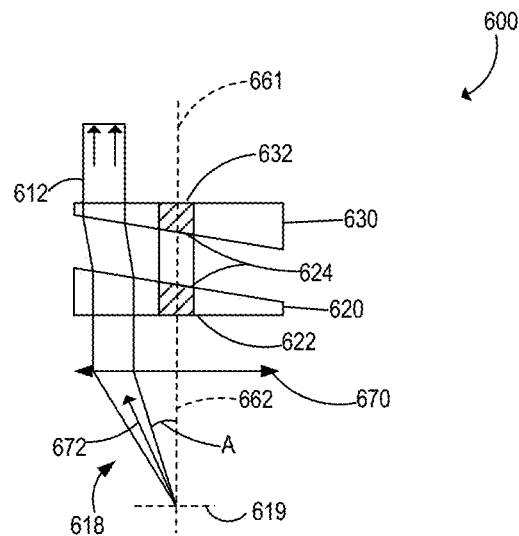
FIG. 6 is a partially schematic illustration of a system having an angularly offset emitted light axis configured in accordance with embodiments of the present technology.
Figure 7:
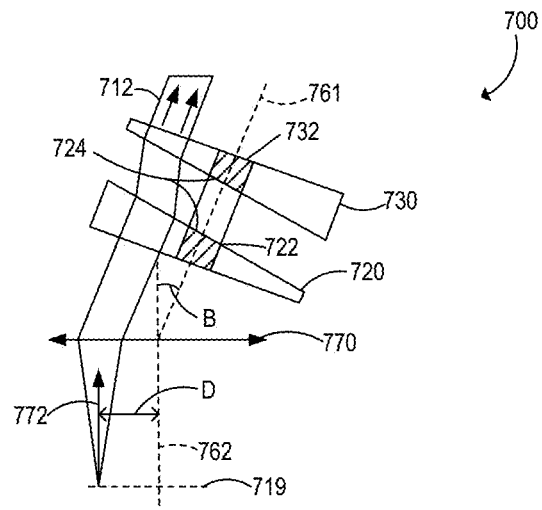
FIG. 7 is a partially schematic illustration of a system having a laterally offset emitted light axis configured in accordance with embodiments of the present technology.

Referring first to FIG. 6, a representative system 600 includes an optical path 618 that extends from a corresponding focal plane 619, at a non-zero inclination angle A relative to an orthogonal axis 662. In FIG. 6, the orthogonal axis 662 is orthogonal to the collimating element 670 and/or the focal plane 619, and is aligned with a shaft axis 661 passing through openings 622, 632 in the corresponding first and second optical elements 620, 630. Because the emitted light 612 is directed radially outwardly from the occlusion areas 624 of the optical elements 620, 630, the optical elements need not include (or need not include as much) light extinction treatment. While the amount of light emitted by the system 600 may be reduced relative to an arrangement that utilizes the full radial extent of the optical elements outside the occlusion areas 624, the light reduction is not expected to significantly affect system performance.

As discussed above with reference to FIG. 6, the illustrated emitted light axis 672 is oriented at an angle relative to the orthogonal axis 662. In other embodiments, the optical elements can be oriented at such an angle. For example, referring now to FIG. 7, a representative system 700 include a focal plane 719 and a corresponding emitted light axis 772 that is offset by an offset distance D from a corresponding orthogonal axis 762 of the corresponding collimating element 770 and/or focal plane 719. The first and second optical elements 720, 730 each have corresponding openings 722, 732 and occlusion areas 724. The optical elements 720, 730 are positioned for rotation about a shaft axis 761, which is oriented at a non-zero inclination angle B relative to the orthogonal axis 762. Accordingly, the emitted light 712 passes along the corresponding emitted light axis 772 in a manner that avoids or reduces impingement on the occlusion areas 724.

Figure 8A:
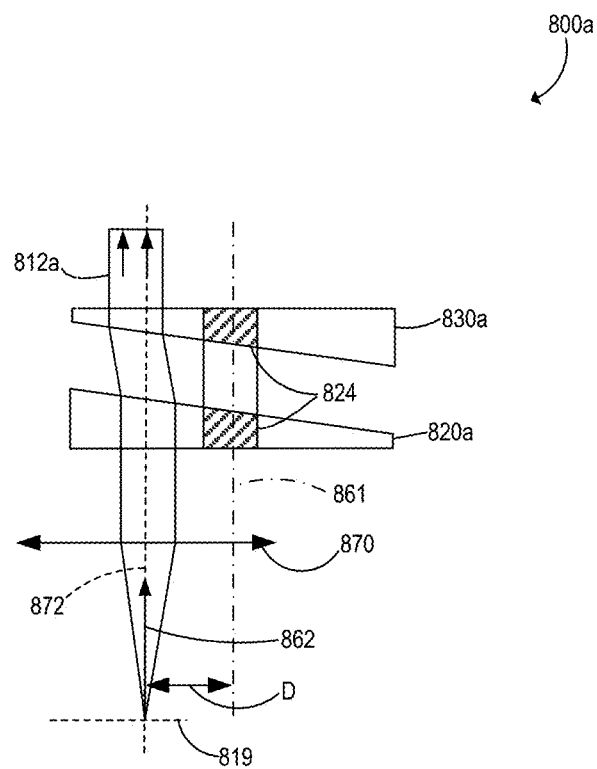
FIG. 8A is a partially schematic illustration of a system having a laterally offset optical axis configured in accordance with further embodiments of the present technology.
Figure 8B:
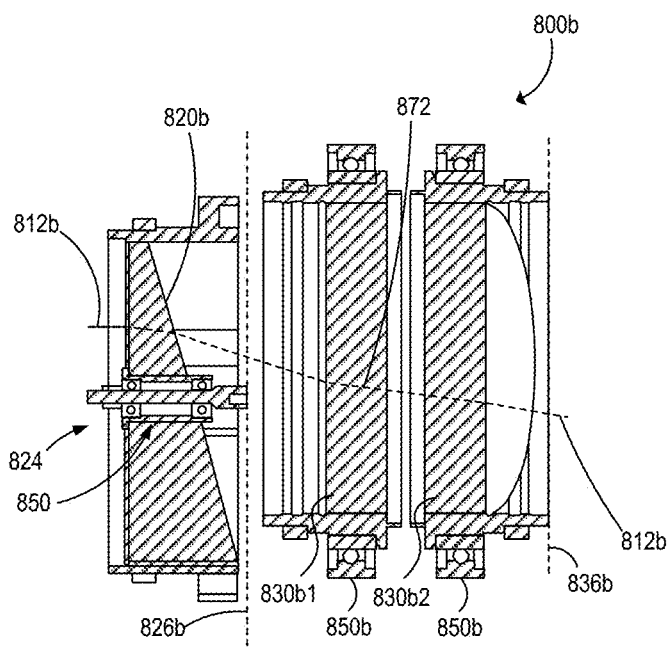
FIGS. 8B and 8C illustrate systems having at least three optical elements configured in accordance with representative embodiments of the present technology.
Figure 8C:
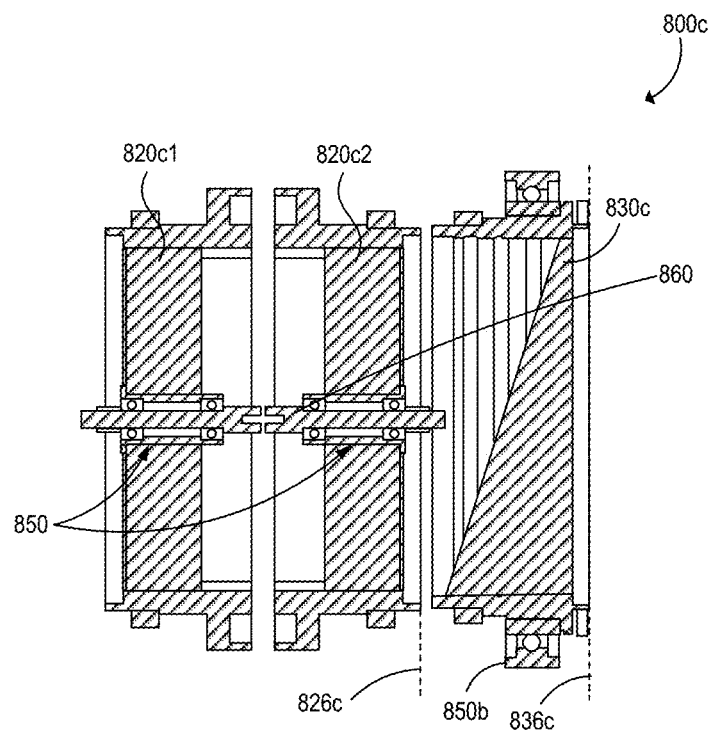

FIGS. 8A-8C illustrate further representative embodiments of systems for which the emitted light is directed (at least in part) around or away from the corresponding occlusion areas. Referring first to FIG. 8A, a system 800a directs emitted light 812a from a corresponding focal plane 819 along an emitted light axis 872 that is offset by an offset distance D from the corresponding orthogonal axis 862 of the collimating element 870 and/or focal plane 819. The system 800a includes first and second optical elements 820a, 830a that rotate relative to the shaft axis 861, while the emitted light 812a bypasses (at least in part) the corresponding occlusion areas 824.

Similar arrangements can be used for systems that include more than two optical elements. For example, FIG. 8B illustrates a representative system 800b that produces emitted light 812b passing through a first optical element 820b to a first plane 826b. The first optical element 820b can be supported using one or more centrally-located small bearings 850, e.g. of the type shown in FIG. 4. The corresponding emitted light axis 872 is offset from the occlusion area 824 associated with the first optical device 820b. The system 800b can further include multiple second optical elements 830b, shown as second optical elements 830b1 and 830b2. The second optical elements 830b redirect the emitted light 812b to a second plane 836b, and can be supported by larger bearings 850b positioned outwardly around the optical elements 830b.

Referring next to FIG. 8C, a representative system 800c includes a shaft 860 carried by multiple first optical elements 820c, illustrated as first optical elements 820c1 and 820c2. The emitted light passes through a first plane 826c, through a corresponding second optical element 830c and to a second optical plane 836c. In this configuration, the first optical elements 820c1, 820c2 are supported by one or more small, centrally-located bearings 850, and the second optical element 830c is supported by a larger, outwardly positioned bearing 850b.

One feature of the representative embodiments shown in FIGS. 8B and 8C is that they can include more than two optical elements. Another feature of the representative embodiments shown in FIGS. 8B and 8C is that they can include a combination of bearing arrangements. For example, the first optical elements in FIGS. 8B and 8C include small bearings 850 positioned close to the rotation axis of the first optical elements, while the second optical elements include larger bearings 850b positioned around the outsides of the second optical elements. The smaller bearings can be used for components having relatively high rotation speeds, and the larger bearings can be used for components having slower rotation speeds. Even if fewer than all the optical elements include bearing arrangements located near the rotation axis (as shown in FIGS. 8B and 8C), the devices nevertheless are expected to provide an overall lighter and more efficient arrangement. In other embodiments (not shown in FIGS. 8B and 8C), all the optical elements, or at least more of the optical elements, can include bearing arrangements with the bearing elements located close to the rotation axis. Further details of the bearing arrangements and associated drive mechanisms are described in further detail below with reference to FIGS. 9-17B.

Figure 9:
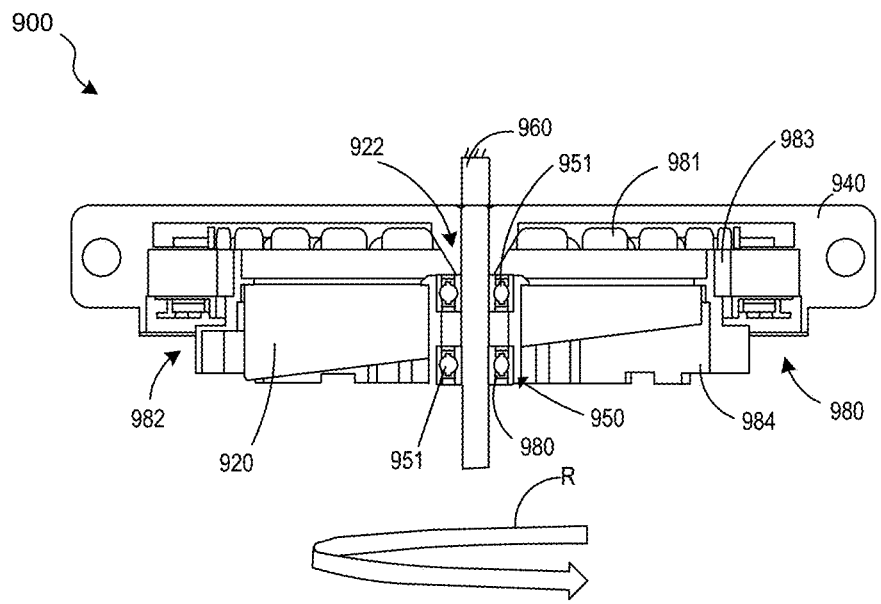
FIG. 9 is a partially schematic illustration of an actuator having bearing elements arranged in accordance with representative embodiments of the present technology.

FIG. 9 is a partially schematic, cross-sectional illustration of a system 900 that includes a housing 940 in which is positioned an actuator 980 that drives an optical element 920 supported relative to a fixed shaft 960 to rotate as indicated by arrow R. The optical element 920 includes an opening 922 through which the shaft 960 passes, and the actuator 980 includes a rotor 982 driven by an outwardly positioned stator 981. The rotor 982 carries a rotor magnet 983 and is attached to a rotor yoke 984. The rotor yoke 984 carries and rotates the optical element 920. A bearing 950 is positioned between the shaft 960 and the optical element 920 (e.g., at least partially within the opening 922) and can include one or more bearing elements 951. Further details of arrangements for supporting and pre-loading the bearing components are described later with reference to FIG. 17A-17B.

Figure 10A:
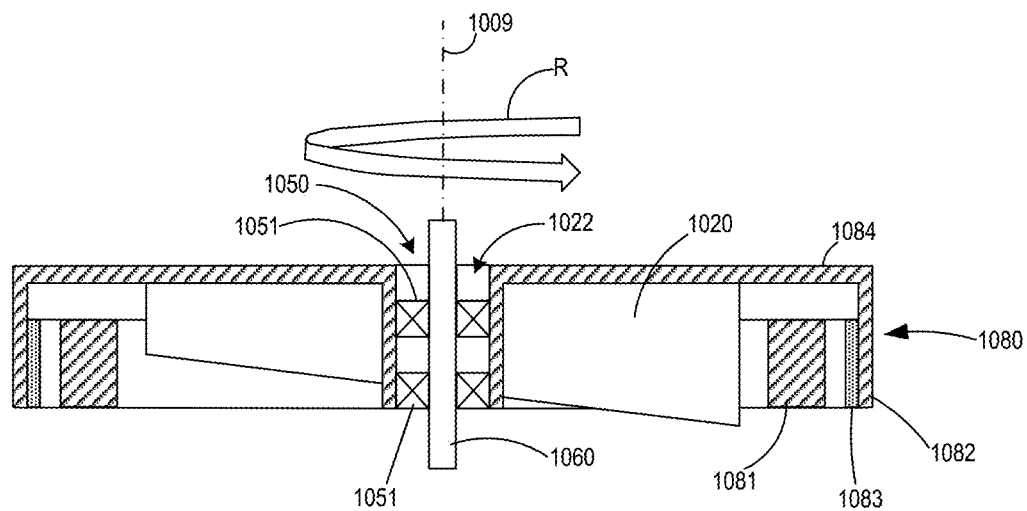
FIG. 10A is a partially schematic illustration of an actuator having an optical element and yoke arranged in accordance with representative embodiments of the present technology.
Figure 10B:
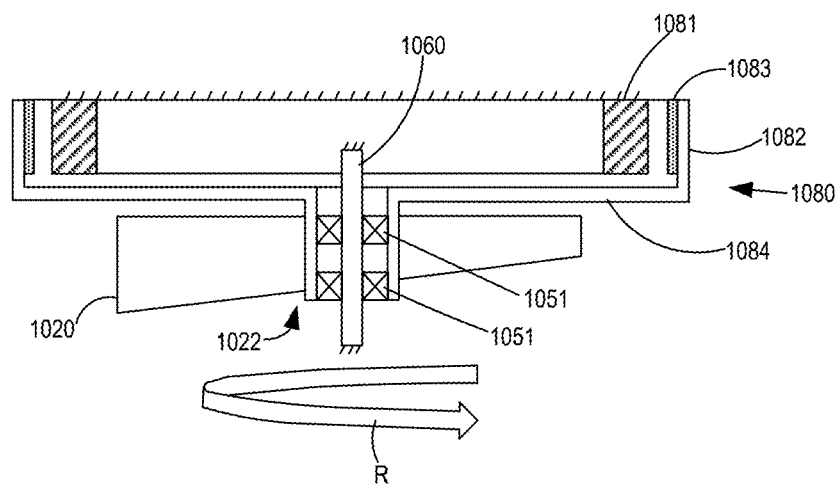
FIG. 10B is a partially schematic illustration of an actuator having a yoke and bearings configured in accordance with further representative embodiments of the present technology.

FIG. 10A illustrates a representative optical element 1020 driven by a corresponding actuator 1080 having a stator positioned radially inwardly from the corresponding rotor. The optical element 1020 can correspond to any of the optical elements described above. The actuator 1080 drives the optical element 1020 to rotate relative to a fixed shaft 1060, as indicated by rotation direction arrow R. The optical element 1020 is supported relative to the shaft 1060 by a bearing 1050 that includes one or more bearing elements 1051. The illustrated actuator 1080 includes a fixed stator 1081, and a rotor 1082 that includes a rotor magnet 1083 that is positioned outwardly from the stator 1081. The rotor 1082 is coupled to the optical element 1020 via a yoke 1084. Accordingly, when energized, the rotor 1082 spins the optical element 1020 about a rotation axis 1009 in the rotation direction R, while the optical element 1020 is stabilized relative to the shaft 1060 via the bearing 1050. As described above, the bearing 1050 is positioned within an opening 1022 positioned along the rotation axis 1009 to reduce the velocities experienced by the bearing elements 1051 and thus reduce heating and wear. The bearing elements 1051 can include ball bearings, and/or other suitable rotary bearing components.

In FIG. 10A, the optical element 1020 is positioned within the ring-shaped stator 1081. In other embodiments, the optical element 1020 can have other positions relative to the stator 1081. For example, referring now to FIG. 10B, the optical element 1020 is positioned axially outside the stator 1081, and outside the rotor magnet 1083. The rotor magnet 1083 is carried by the rotor 1082, which is connected to the optical element 1020 via the yoke 1084 in a manner generally similar to that described above with reference to FIG. 10A. An advantage of the arrangement shown in FIG. 10A is that the "nested" arrangement of the optical element 1020 within the stator 1081 and rotor 1082 can provide for a compact arrangement.

Figure 11:
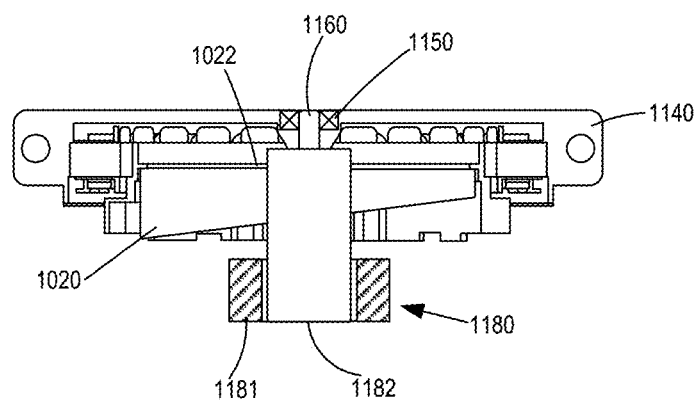
FIG. 11 is a partially schematic illustration of an actuator having a rotor positioned within an optical element in accordance with representative embodiments of the present technology.

FIG. 11 is a partially schematic illustration of another actuator 1180 having the optical element 1020 positioned axially away from the corresponding stator 1181 and rotor 1182. In addition, in this embodiment, the corresponding shaft 1160 is supported relative to a housing 1140 via a bearing 1150. The rotor 1182 is connected to the optical element 1020 to rotate the optical element 1020, and is connected to the shaft 1160 which stabilizes the optical element 1020 relative to the housing 1140 via the bearing 1150.

Figure 12A:
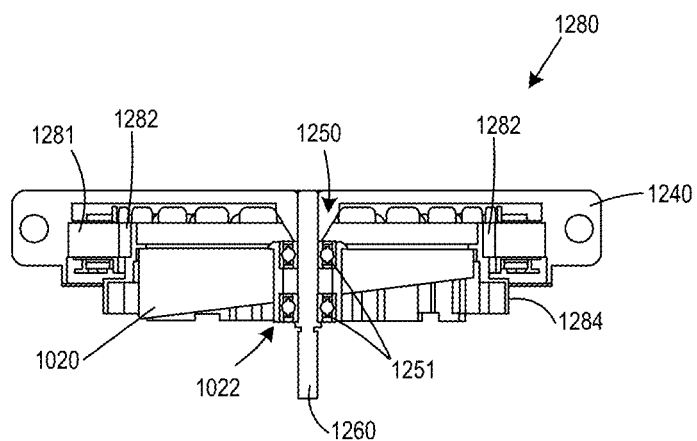
FIG. 12A is a partially schematic illustration of an actuator having bearing elements and a yoke carrying an optical element in accordance with embodiments of the present technology.

FIG. 12A illustrates a representative actuator 1280 having a housing 1240 carrying a fixed stator 1281 and a fixed shaft 1260. The stator 1281 drives a corresponding rotor 1282, which carries the optical element 1020 via a yoke 1284. The optical element 1020 is stabilized relative to the shaft 1260 via a corresponding bearing 1250 having one or more bearing elements 1251.

Figure 12B:
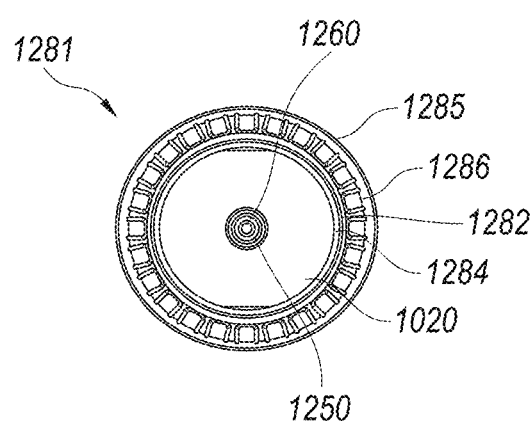
FIG. 12B is a partially schematic illustration of a representative stator of the type shown in FIG. 12A.
Figure 12C:
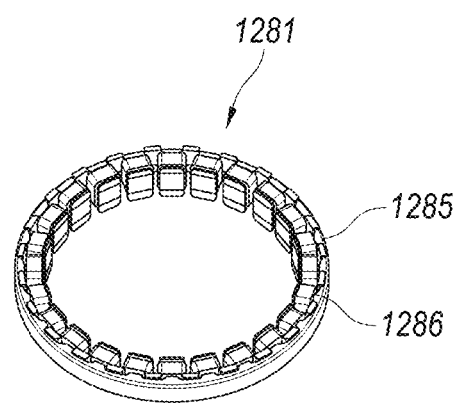
FIG. 12C is a partially schematic, isometric illustration of a stator configured in accordance with representative embodiments of the present technology.
Figure 12D:
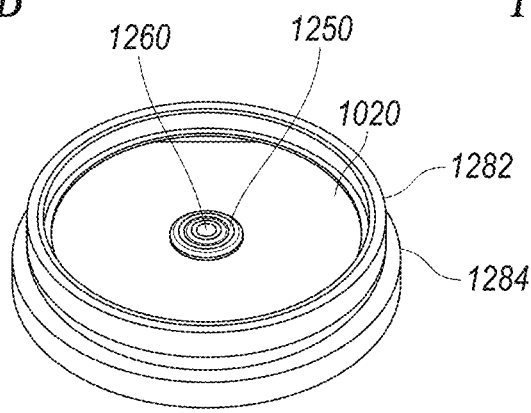
FIG. 12D is a partially schematic, isometric illustration of a rotor carried by a yoke and configured in accordance with representative embodiments of the present technology.

FIG. 12B illustrates several of the elements described above with reference to FIG. 12A, including the shaft 1260, the stator 1281, and the rotor 1282. The stator 1281 includes a stator core 1285 having stator windings 1286. The core 1285 and windings 1286 are shown in further detail in FIG. 12C. FIG. 12D illustrates an isometric view of the shaft 1260, the bearing 1250 (positioned outwardly from the shaft 1260), the optical element 1220 (positioned outwardly from the bearing 1250), the rotor 1282 (positioned outwardly from the optical element 1220), and the yoke 1284 (positioned outwardly from the rotor 1282). The yoke 1284 can be a part of the rotor 1282, or can be attached to the rotor. The yoke 1284/rotor 1282 can carry a magnet, which is driven by the electrical current carried by the stator windings 1286.

FIGS. 13A-15B illustrate representative arrangements for supporting shafts and for reducing optical noise in a scanner via inclined, sloped, or angled surfaces. Referring first to FIG. 13A, a representative scanner 1304 include a first optical element 1320 driven by a corresponding first actuator 1380a, and a second optical element 1330 driven by a second actuator 1380b. The scanner 1304 can further include a shaft 1360 which stabilizes the optical elements 1320, 1330 as they rotate, and a shaft support 1363 that supports the shaft 1360. The shaft support 1363 can include (or form a part of) an overall housing 1340 in which the optical elements 1320, 1330 are positioned. The shaft support 1363 can further include a rim 1364 carrying one or more spokes 1366. The spokes 1366 in turn carry a hub 1365 in which the shaft 1360 is received. The spokes 1366 can be thicker or deeper than they are wide, to provide increased strength (e.g., against bending) while reducing optical interference. In the illustrated embodiment, the shaft 1360 is fixed relative to the shaft support 1363. In other embodiments, the shaft 1360 can rotate, and can accordingly include bearings of the type described herein.

FIG. 13B illustrates an arrangement similar to that shown in FIG. 13A, with the shaft support 1363 including two spokes 1366 rather than three. The reduced number of spokes 1366 shown in FIG. 13B can reduce optical interference in the scanner 1304, while the increased number of spokes 1366 shown in FIG. 13A can improve the stability of the shaft 1360.

FIG. 14A illustrates an arrangement similar to that shown in FIG. 13B, but with selected elements including sloped, angled, or inclined surfaces so as to avoid or attenuate optical reflections within the scanner 1304. For example, several elements can include sloped surfaces 1367 (e.g., chamfers), including first sloped surfaces 1367a carried by the spokes 1366, second sloped surfaces 1367b carried by the hub 1365, and/or third sloped surfaces 1367c carried by the shaft 1360. The sloped surfaces can redirect emitted light 1312 exiting the collimating element 1370 so as to be absorbed by other elements in the scanner 1304 (e.g., the surfaces of the rim 1364 or the housing 1340) before reaching the first optical element 1320.

In an embodiment shown in FIG. 14A, the sloped surfaces form a peak or inverted "V" shape. In other embodiments, for example as shown in FIG. 14B, the sloped surfaces can be sloped in a single direction. In particular, the hub sloped surface 1367b is sloped in a single direction, as is the shaft sloped surface 1367c. In other embodiments, the sloped surfaces can have orientations and/or configurations other than those shown in FIGS. 14A-14B.

Figure 15A:
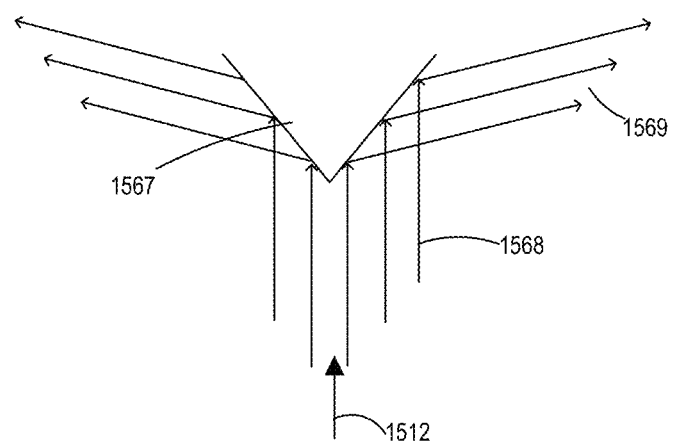
FIGS. 15A and 15B illustrate details of representative inclined surfaces in accordance with embodiments of the present technology.

FIG. 15A illustrates a representative sloped surface 1567 having a "V" shaped configuration. Emitted light 1512 forms incident radiation 1568, which is then redirected by the sloped surfaces 1567 to form reflected radiation 1569, which can be absorbed internally by other elements of the scanner 1304 (FIG. 14A).

Figure 15B:
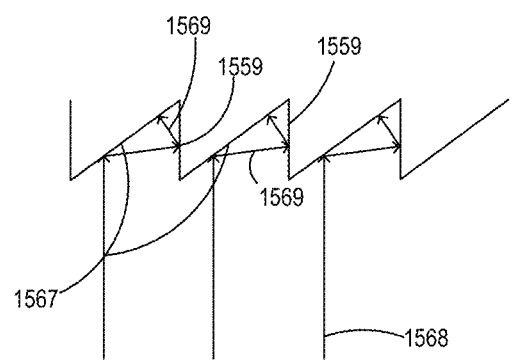

In FIG. 15B, the sloped surfaces 1567 are positioned adjacent to corresponding absorptive surfaces 1559. The absorptive surfaces 1559 receive and absorb or extinguish the reflected radiation 1569. This arrangement can further reduce the optical noise within the associated scanner by capturing and absorbing reflected radiation before it is transmitted further within the scanner.

Figure 16A:
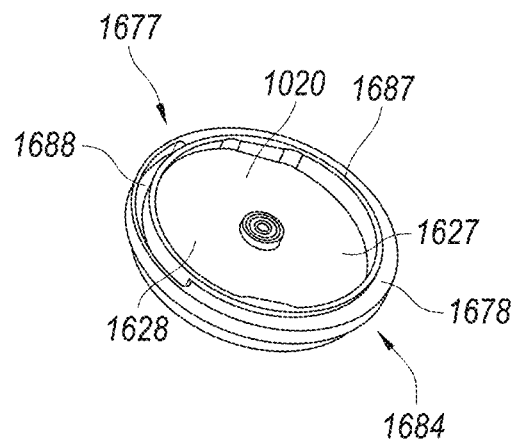
FIGS. 16A and 16B illustrate optical elements and corresponding yokes configured in a rotationally balanced combination in accordance with representative embodiments of the present technology.
Figure 16B:
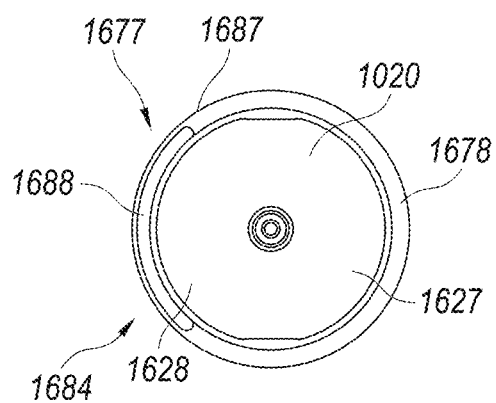

FIGS. 16A and 16B illustrate arrangements for balancing optical devices so as to reduce the tendency for the optical devices to wobble when rotated, and therefore reduce the loads on the associated bearings. Because the optical element 1020 can have a wedge or prism shape (see, e.g., FIG. 12A), the optical element 1020 can include a lighter region 1627 (toward the narrower side of the wedge) and a heavier region 1628 (toward the thicker side of the wedge). To account for this asymmetry, the yoke 1684 can include a complementary heavier region 1678 (positioned adjacent the lighter region 1627 of the optical element 1020) and a lighter region 1677 (positioned adjacent the heavier region 1628 of the optical element 1020). In particular embodiments shown in FIGS. 16A and 16B, the lighter region 1677 of the rim 1687 can be made lighter via one or more apertures 1688. In other embodiments, other techniques (e.g., using materials of different densities) can be used to provide a relative weight difference between the heavier region 1678 and the lighter region 1677. In any of these embodiments, as described above, the complementary lighter and heavier regions 1677, 1678 can balance the corresponding heavier and lighter regions 1628, 1627 of the optical element 1020 to provide an overall balanced assembly.

Figure 17A:
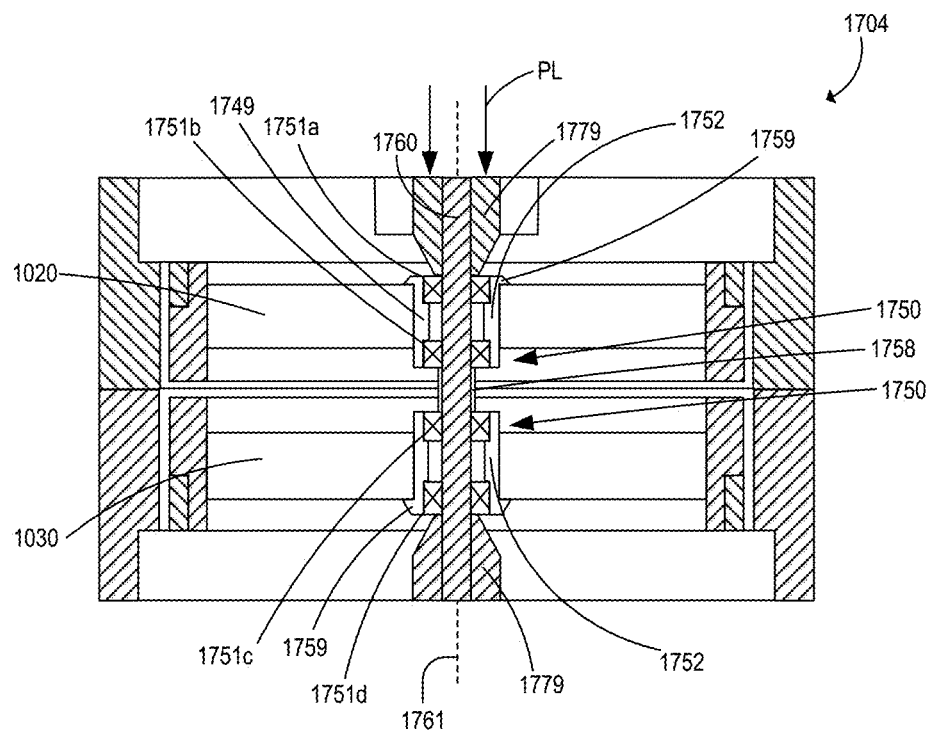
FIGS. 17A and 17B illustrate representative systems configurations with preload forces applied to corresponding bearing elements in accordance with representative embodiments of the present technology.
Figure 17B:
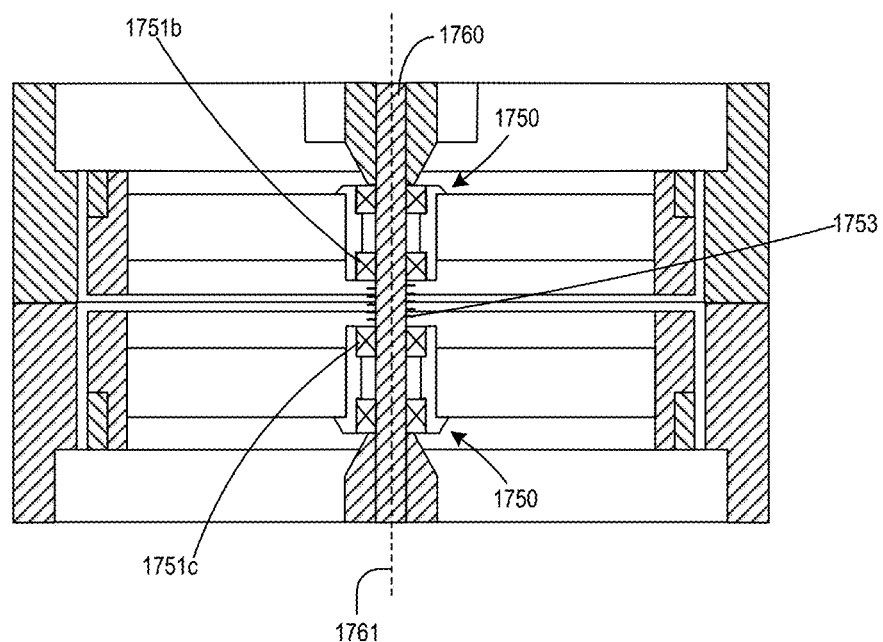

FIGS. 17A and 17B illustrate techniques for applying a preload to the bearings that stabilize the rotary motion of the optical elements. Referring first to FIG. 17A, a representative scanner 1704 includes a first optical element 1020 and second optical element 1030, each supported by corresponding bearings 1750. The bearings can include one or more bearing elements, including first and second bearing elements 1751a, 1751b carried by one bearing 1750 (e.g., a bearing retainer or pedestal 1752), and third and fourth bearing elements 1751c, 1751d carried by the other bearing 1750. Each bearing 1750 (e.g., the bearing elements 1751a, 1751b, 1751c, 1751d) can include an inner race, outer race, and multiple balls between the inner and outer races. The inner races are fixed relative to the shaft 1760, and the outer races are fixed relative to the corresponding bearing retainer or pedestal 1752, which is in turn fixed relative to the corresponding optical element 1020, 1030. Two stator couplings 1779 support the fixed shaft 1760 (aligned along a shaft axis 1761) within the bearings 1750. An optional shaft sleeve 1758 provides a mechanical connection between the two bearings 1750. Accordingly, when an applied preload PL is applied to one stator coupling 1779, the force is transmitted to the other bearing 1750 (via the shaft sleeve 1758) to keep the bearings in position along the shaft 1760. In addition, an inwardly-facing step or projection 1749 of the bearing retainer 1752 can form two-oppositely facing recesses in which the bearing outer races are positioned, with the inwardly-facing step engaged with each bearing outer race. The shaft sleeve 1758 can engage the bearing inner races, causing the inner and outer races to be biased in opposite directions. The bearing retainer 1752 can also include one or more outwardly-facing steps or projections 1759 that engage with the corresponding first or second optical element 1720, 1730. The outer surface of the shaft 1760, and the inner surfaces of the bearings 1750, can be coated with an adhesive which is dried or cured before the preload PL is released. Accordingly, the adhesive can preserve the preload after manufacture. In another embodiment, shown in FIG. 17B, the shaft sleeve 1758 can be replaced by a biasing element 1753 (e.g., a spring) that biases the two bearings 1750 away from each other, as an alternate technique for preloading the bearings and keeping the bearings in fixed positions relative to the shaft 1760.

As discussed above, representative optical elements have a wedge or prism shape. This shape can be formed by an orthogonal surface (orthogonal to the incoming or outgoing optical path, or to the shaft axis 1761), and an inclined surface (inclined relative to the same path or optical axis). Multiple optical elements can have these surfaces arranged relative to each other in any of a number of suitable configurations, as illustrated below with reference to FIGS. 18A-18B.

Figure 18A:
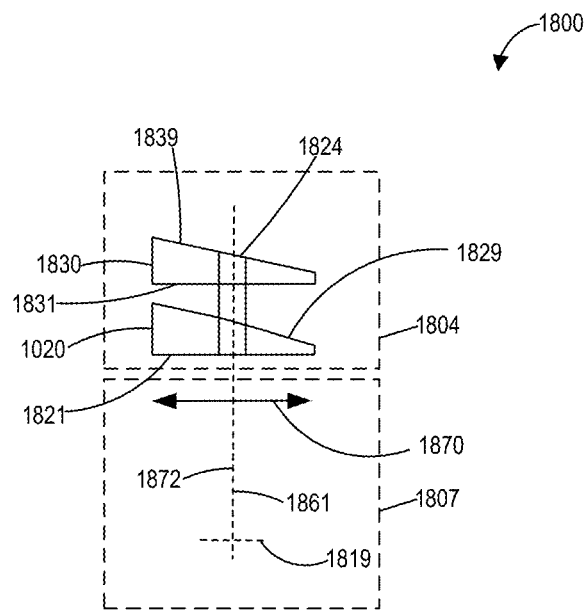

Referring first to FIG. 18A, a representative system 1800 includes a transceiver 1807 and a scanner 1804. The transceiver 1807 includes an emitter and receiver (not shown in FIG. 18A) with a corresponding focal plane 1819 and optical path 1872. A collimator 1870 collimates the emitted radiation and directs it to the scanning module 1804. The scanning module 1804 houses the first optical element 1020 and the second optical element 1030 that rotate relative to a shaft or rotation axis 1861. The first optical element 1020 can include an orthogonal surface 1821 (orthogonal relative to the optical path 1872 and/or rotation axis 1861) and an inclined surface 1829 (oriented at a non-orthogonal angle relative to the optical path 1872 and/or rotation axis 1861). Similarly, the second optical element 1030 can include an orthogonal surface 1831 and an inclined surface 1839. In an embodiment shown in FIG. 18A, the inclined surface 1829 of the first optical element 1020 faces toward the orthogonal surface 1831 of the second optical element 1030.

Figure 18B:
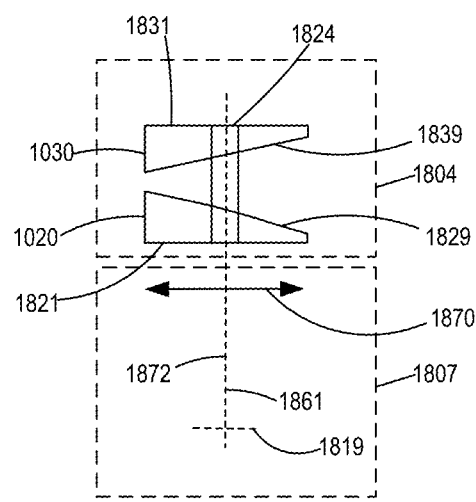

In an embodiment shown in FIG. 18B, the inclined surface 1829 of the first optical element 1020 faces toward the inclined surface 1839 of the second optical element 1030. In FIG. 18C, the orthogonal surface 1821 of the first optical element 1020 faces toward the inclined surface 1839 of the second optical element 1030. In FIG. 18D, the orthogonal surface 1821 of the first optical element 1020 faces toward the corresponding orthogonal surface 1831 of the second optical element 1030. In FIG. 18E, each of the first and second elements 1020 includes multiple (e.g., two) inclined surfaces. Accordingly, the first optical element 1020 includes two opposing inclined surfaces 1829, and the second optical element 1030 includes two inclined surfaces 1839. In still further embodiments, the optical elements can have different arrangements of surfaces and/or orientations. In any of these embodiments, the optical elements can be supported by bearings and/or driven by motors having any suitable one (or more) of the configurations described herein. As discussed above, such arrangements can provide lightweight, compact, long-lasting reduced power, and/or otherwise beneficial devices for scanning the environment around a mobile platform.

Figure 19:
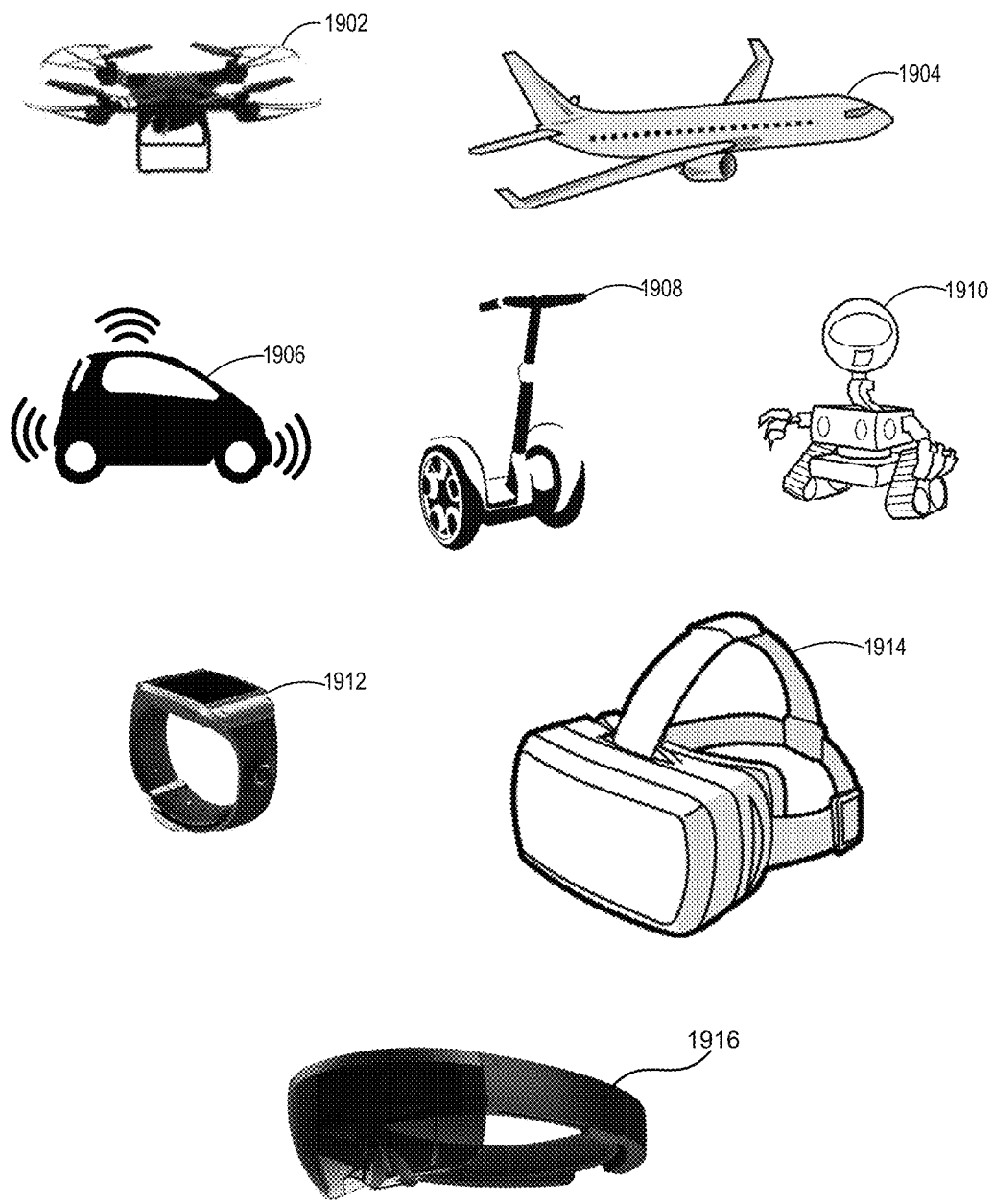
FIG. 19 is a partially schematic illustration of representative vehicles and/or other devices on which sensing systems described herein are included, in accordance with representative embodiments of the present technology.

FIG. 19 illustrates examples of mobile platforms configured in accordance with various embodiments of the presently disclosed technology. As illustrated, a representative mobile platform as disclosed herein may include at least one of an unmanned aerial vehicle (UAV) 1902, a manned aircraft 1904, an autonomous vehicle 1906, a self-balancing vehicle 808, a terrestrial robot 1910, a smart wearable device 1912, a virtual reality (VR) head-mounted display 1914, or an augmented reality (AR) head-mounted display 1916.

From the foregoing, it will be appreciated that specific embodiments of the present technology have been described herein for purposes of illustration, but that various modification may be made without deviating from the technology. For example, the components described herein can have suitable shapes and/or dimensions that deviate from those expressly shown in the figures, while still providing one or more of the associated benefits described above. In a particular example, while the openings in the optical elements are shown in the Figures as circular, in other embodiments, the openings can have other shapes, as can the corresponding shafts. In general, the associated bearings will still have radial symmetry so as to allow for rotation.

Certain aspects of the technology described in the context of particular embodiments may be combined or eliminated in other embodiments. For example, embodiments showing two optical elements may, in at least some representative examples, include one optical element, or more than two optical elements. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

We claim:

1. An optical system, comprising:
   at least one optical element positioned along an optical path to receive radiation, the at least one optical element having an opening therethrough;
   a shaft extending through the opening;
   at least one bearing operably coupled to the shaft; and
   a motor operably coupled to the at least one optical element to rotate the at least one optical element;
   wherein at least one of the following is satisfied:
   the shaft is fixed, the motor includes a first stator positioned in the opening and carried by the shaft, and a first rotor positioned in the opening carried by the at least one optical element, outwardly from the first stator, and the at least one bearing is positioned in the opening between the fixed shaft and the first rotor;
   the shaft is fixed, the motor includes a second stator that is fixed relative to the shaft, and a second rotor positioned outwardly from the second stator and rotatable relative to the second stator, the second rotor is configured to carry the at least one optical element, and the at least one bearing is positioned in the opening between the fixed shaft and the second rotor;
   the motor includes a first housing, a third stator, and a third rotor positioned inwardly from the third stator and rotatable relative to the third stator, the third rotor is fixed to the shaft and configured to carry the at least one optical element, and the at least one bearing is positioned outside the opening between the shaft and the first housing of the motor; or
   the motor includes a fourth stator, and a fourth rotor positioned inwardly from the fourth stator and rotatable relative to the fourth stator, the fourth rotor is configured to carry the at least one optical element, and the at least one bearing is positioned within the opening between the shaft and the at least one optical element.

2. The system of claim 1, wherein the at least one optical element includes a refractive element having opposing, non-parallel surfaces.

3. The system of claim 1, wherein;
   the motor includes the fourth stator, and the fourth rotor positioned inwardly from the fourth stator and rotatable relative to the fourth stator, the fourth rotor is configured to carry the at least one optical element, and the at least one bearing is positioned within the opening between the shaft and the at least one optical element; and
   the motor further includes a second housing, and wherein the shaft is fixed relative to the second housing.

4. The system of claim 1, further comprising a shaft support positioned to support the shaft relative to the motor.

5. The system of claim 4, wherein the shaft support includes a hub engaged with the shaft, a rim carried by the motor, and a plurality of spokes between the hub and the rim.

6. The system of claim 4, wherein at least one of the shaft support or the shaft includes a surface inclined at a non-orthogonal angle relative to the optical path to direct light off the optical path.

7. The system of claim 4, wherein the shaft includes an end surface inclined at a non-orthogonal angle relative to the optical path to direct light off the optical path.

8. The system of claim 1, wherein the at least one bearing is axially loaded to at least reduce axial motion between elements of the at least one bearing.

9. The system of claim 8, further comprising a pedestal having at least one of an inwardly facing step engaged with the at least one bearing or an outwardly facing step engaged with the at least one optical element.

10. The system of claim 9,
    wherein the at least one bearing includes two bearing elements, each bearing element including an inner race and an outer race, and
    wherein the outer races of each bearing element are positioned on opposite sides of the inwardly facing step and are engaged with the inwardly facing step.

11. The system of claim 8,
    wherein the at least one optical element includes a first optical element and a second optical element positioned along the optical path, each of the first and second optical elements having an opening therethrough,
    wherein the shaft extends through the opening of the first optical element, and through the opening of the second optical element,
    wherein the at least one bearing includes a first bearing having first and second bearing elements, and a second bearing having third and fourth bearing elements, and
    the system further comprising:
    a first pedestal positioned in the opening of the first optical element and outwardly engaged with the first optical element and inwardly engaged with the first and second bearing elements; and
    a second pedestal positioned in the opening of the second optical element, the second pedestal outwardly engaged with the second optical element and inwardly engaged with the third and fourth bearing elements.

12. The system of claim 11,
    wherein each of the first and second bearing elements includes an inner race and an outer race, and
    wherein the inner and outer races are biased in opposite directions.

13. The system of claim 8,
    wherein the at least one bearing includes an inner race, an outer race, and a plurality of balls between the inner and outer races, and
    wherein the outer race is adhered to a pedestal with a preload force applied to the inner race.

14. The system of claim 13, wherein the pedestal is engaged with the at least one optical element.

15. The system of claim 8, wherein the at least one bearing includes an inner race, an outer race, a plurality of balls between the inner and outer races, and a spring biasing the inner race relative to the outer race.

16. An optical system, comprising:
    a first prism positioned along an optical path to receive radiation, and having a first opening extending therethrough;
    a second prism positioned along the optical path to receive radiation, and having a second opening extending therethrough;
    a shaft extending through the first and second openings and having an end surface inclined at a non-orthogonal angle relative to the optical path to direct light off the optical path;

a first motor having:
  a first stator,
  a first rotor positioned inwardly from the first stator and rotatable relative to the first stator, the first rotor carrying the first prism via a first yoke, and
  a first shaft support engaged with the shaft;
a second motor having:
  a second stator,
  a second rotor positioned inwardly from the second stator and rotatable relative to the second stator, the second rotor carrying the second prism via a second yoke, and
  a second shaft support engaged with the shaft;
at least one first bearing operably coupled between the shaft and the first prism; and
at least one second bearing operably coupled between the shaft and the second prism, wherein:
  each of the first shaft support and second shaft support includes a hub engaged with the shaft, a rim carried by each of the first motor and second motor, respectively, and a plurality of spokes between the hub and the rim;
  each of the first prism and second prism has a weight distribution that is not axisymmetric relative to the shaft, and
  each of the first yoke and second yoke has a weight distribution that is complementary to the weight distribution of the first prism and second prism, respectively.

17. An optical system, comprising:

at least one optical element positioned along an optical path to receive radiation, the at least one optical element having an opening therethrough;

a shaft extending through the opening;

at least one bearing operably coupled to the shaft; and a motor operably coupled to the at least one optical element to rotate the at least one optical element;

wherein the at least one bearing is axially loaded to at least reduce axial motion between elements of the at least one bearing.

\* \* \* \* \*